United States Patent [19]

Henderson

[11]  4,255,845

[45]  Mar. 17, 1981

[54] PROCESS FOR REPAIRING SMALL LEAKS IN METALLIC VESSELS

[76] Inventor: Harry J. Henderson, 1914 N. Tenth, Fargo, N. Dak. 58102

[21] Appl. No.: 962,245

[22] Filed: Nov. 20, 1978

[51] Int. Cl.$^3$ .................................................. B23P 7/00
[52] U.S. Cl. .................................. 29/402.02; 156/94; 220/363; 220/364; 29/402.18; 29/530
[58] Field of Search ........... 29/401 A, 402.02, 402.18, 29/530, 404, DIG. 1; 156/94; 220/364, 363, 365, 361

[56] References Cited

U.S. PATENT DOCUMENTS

| | | | |
|---|---|---|---|
| 2,727,650 | 12/1955 | Moynihan et al. | 29/402.09 |
| 2,903,877 | 9/1959 | Meade | 29/401 A |
| 3,251,461 | 5/1966 | Smith | 29/402.09 |
| 3,465,420 | 9/1969 | Webb et al. | 29/401 A X |
| 3,645,816 | 2/1972 | Billias et al. | 29/402.09 |
| 4,073,836 | 2/1978 | Harrison et al. | 29/402.02 |
| 4,175,311 | 11/1979 | Bunyan | 29/402.18 |

*Primary Examiner*—Francis S. Husar
*Assistant Examiner*—V. K. Rising
*Attorney, Agent, or Firm*—Ralph F. Staubly

[57] ABSTRACT

Porosity or other types of small leaks in metallic vessels designed to hold fluids under pressure or partial vacuum are repaired by: (1) sealing the chamber of the vessel, (2) introducing (preferably inert) gas at high pressure into the chamber, (3) immersing the vessel in a liquid (water) bath to locate and mark the leak(s), (4) mechanically cleaning the leak areas(s) while the gas pressure is maintained, (5) releasing the gas pressure and drawing a high partial vacuum in the chamber, (6) applying solvent to the leak area(s) to be suction-drawn through, and to clean, the leak(s), (7) while maintaining the partial vacuum, applying a liquid epoxy cement filled with a powdered metal compatible with that of the vessel, and (8) promptly heating the repaired area(s) to a moderate temperature and then releasing the vacuum. The repair will set in a few minutes and cure in several hours. The repair area(s) can be lightly abrasion-cleaned to remove any excess cement.

6 Claims, 4 Drawing Figures

PROCESS FOR REPAIRING SMALL LEAKS IN METALLIC VESSELS

BACKGROUND AND OBJECTS OF THE INVENTION

Porosity or other-type small leaks in metallic vessels (castings) usually intended to hold fluids under high positive or negative pressure, are a serious economic problem in the metal-vessel (especially casting) art. Attempts to seal such leaks by electric or flame welding have proven generally unsatisfactory, especially if the vessel is an aluminum-alloy casting because the worked-on areas would be made rough and discolored by the attempted repair. It is accordingly the principal object of this invention to provide a metallic-vessel-leak-repair method that economically produces a structurally sound repair job and which leaves the repair area unblemished. Other objects and advantages will become apparent as the following description proceeds.

DETAILED DESCRIPTION

Figure 1:
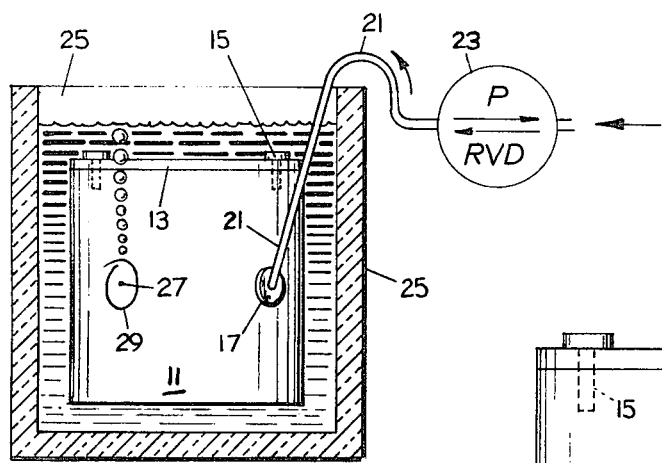
FIG. 1 is a largely schematic elevational view showing the leak-locating step of the invention

With reference now to the drawings, the numeral 11 generally designates a hollow metallic (e.g. aluminum-alloy) vessel, usually a casting, having an open top sealingly closed by a plate 13 fixed thereto as by machine screws 15. At least one wall of the casting may have at least one later-useful outlet aperture 17, which is herein shown being temporarily used to introduce a gas under high pressure (e.g. 300 psi) through a hose 21 connected to a reversible variable-delivery pump 23.

In FIG. 1 the sealed vessel 11 is shown immersed in a water-bath 25. The gas bubbles B locate the leak 27 which is then marked, as by a crayon-applied circle 29. Then the vessel 11 is removed from the water-bath 25, and with high pressure maintained therein, the leak area is mechanically (abrasively) cleaned.

Figure 2:
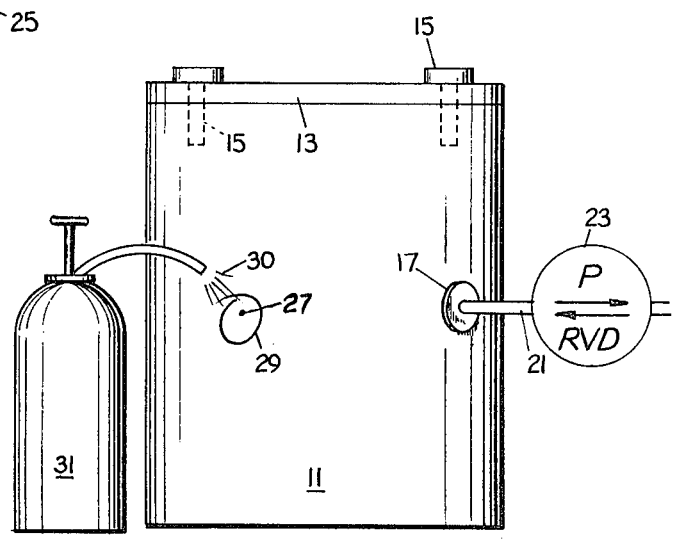
FIG. 2 is a similar view illustrating the leak-area-cleaning step.
Figure 3:
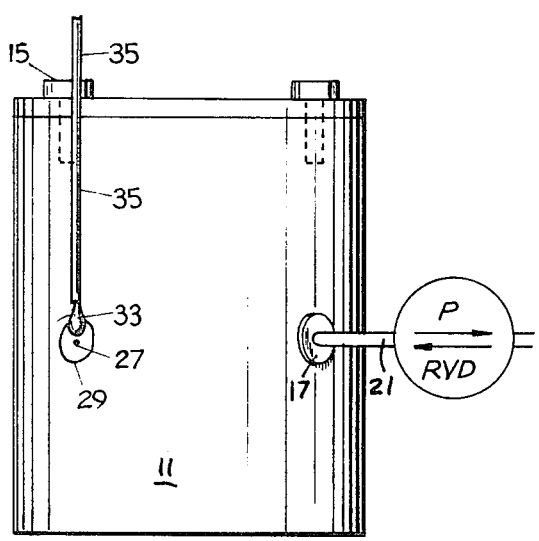
FIG. 3 is a like view showing the cement-applying step.
Figure 4:
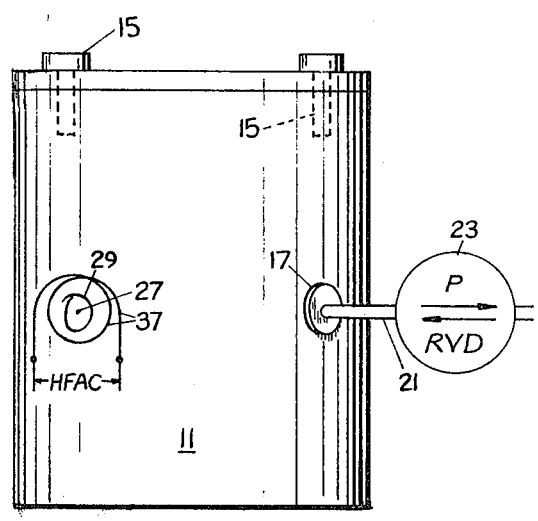
FIG. 4 is a similar view illustrating electric-induction-heating of the repair area.

Next the pressure is released, a high partial vacuum is produced and cleaning liquid 30 (FIG. 2), as from a conventional spray-bottle 31, is applied to be sucked into and through the small leak 27. With the high partial-vacuum (e.g. minus 14 psi gage) maintained, a drop 33 of powdered-metal-filled epoxy or other volumetrically stable cement is applied (as by a tube or rod 35) to the leak 27 and is suction-drawn thereinto.

Simultaneously with or immediately after the cement application, the area is moderately heated e.g. to 300° F. by suitable means (e.g. an electric-induction-heating coil 37) to somewhat expand the leak hole for better filling and to accelerate (catalytic) setting of the cement. The heating could also be produced by a laser, by a maser or by infrared radiation focused onto the area by an ellipsoidal or other-type reflector in known manner.

The epoxy cement preferably will be filled with sufficient powdered metal (which is of the same composition as the casting metal or is a fully compatible one) to make the repair practically undetectable to the naked eye after the repair area is lightly abrasively cleaned to remove any excess cement.

The invention having been described, what is claimed is:

1. A method for repairing small leaks in metallic vessels intended to hold fluids under positive or negative gas pressure, comprising: (1) sealing the chamber of said vessel, (2) connecting said chamber to pneumatic means for varying the gas pressure in said chamber, (3) abrasively cleaning each leak area while said chamber is pressurized, (4) applying a volumetrically-stable-setting cement to each leak point, and (5) pressure-forcing said cement into each leak.

2. A method according to claim 1, said volumetrically-stable-setting cement being an epoxy cement.

3. A method according to claim 2, said epoxy cement containing metallic powder so as to match the color and texture of the metal of said vessel.

4. A method according to claim 1 and further comprising exteriorily applying solvent material for cleaning each leak area between abrading and cementing steps while the chamber is partially evacuated.

5. A method according to claim 1 and additionally comprising heating each being-repaired leak area (1) to expand the volume of the leak so as to receive more cement therein, and (2) to accelerate the setting of the cement.

6. A method for repairing small leaks in a metal vessel intended to hold fluids under positive or negative gage pressure, comprising: (1) sealing the chamber of said vessel, (2) connecting said chamber to pneumatic means for varying the gas pressure therein, (3) applying a volumetrically-stable-setting cement externally to said small leaks, and (4) creating a low-pressure partial vacuum in said chamber during the application of said sealing cement whereby said cement is forced by atmospheric pressure into said leaks.

* * * * *